United States Patent [19]

Müller et al.

[11] 4,378,999

[45] Apr. 5, 1983

[54] PULVERULENT BITUMEN CONCENTRATE AND ITS USE

[75] Inventors: Karl-Hans Müller, Brochköbel; Walter Barthel, Langenselbold, both of Fed. Rep. of Germany

[73] Assignee: Degussa AG, Frankfurt, Fed. Rep. of Germany

[21] Appl. No.: 175,742

[22] Filed: Aug. 6, 1980

[30] Foreign Application Priority Data

Aug. 17, 1979 [DE] Fed. Rep. of Germany ....... 2933339

[51] Int. Cl.³ .............................................. C08L 95/00
[52] U.S. Cl. ............................ 106/281 R; 106/287.34
[58] Field of Search .............. 106/281 R, 287.34, 284; 208/23

[56] References Cited

U.S. PATENT DOCUMENTS

| | | | |
|---|---|---|---|
| 2,949,378 | 8/1960 | Agren et al. | 106/281 |
| 3,766,074 | 10/1973 | Brouillette | 252/62.54 |
| 3,920,470 | 11/1975 | Bertrand | 106/288 B |
| 4,100,059 | 7/1978 | Jinno | 209/3 |
| 4,189,238 | 2/1980 | Mendenhall | 106/281 R |

FOREIGN PATENT DOCUMENTS 2009758  6/1979  United Kingdom .

OTHER PUBLICATIONS

The Chemistry of Silica, by Ralph K. Oler, p. 25.

*Primary Examiner*—John Kight, III
*Assistant Examiner*—Amelia B. Yarbrough
*Attorney, Agent, or Firm*—Cushman, Darby & Cushman

[57] ABSTRACT

Powdery bitumen concentrates are prepared containing 10 to 85 weight %, preferably 40 to 80 weight %, of synthetic silica. The concentrate is used in asphalt mixtures for building roads to give high stiffening value thereto.

11 Claims, No Drawings

PULVERULENT BITUMEN CONCENTRATE AND ITS USE

BACKGROUND OF THE INVENTION

According to DIN 55946 (German Industrial Standard 55946) bitumens are a dark colored, semisolid to brittle, meltable, high molecular weight hydrocarbon mixtures which are obtained in the careful refining of petroleums and the portion of the natural asphalts as well as mineral wax and montan wax soluble in carbon disulfide (see Römpp Lexikon der Chemie, 7th Edition, page 377).

These kinds of materials which in the Anglo-Saxon region (above all the U.S.A.) are designated as asphalt are employed admixed with limestone powder, granite powder, basalt powder, greenstone powder and gabbro powder in the building of streets.

In this connection of especial significance is the use of natural asphalt.

Natural asphalt can be employed in admixture with bituminous binders according to DIN 1995 for the production of mortar rich coating layers (e.g., cast asphalt, asphalt concrete, sand asphalt and asphalt mastic). A natural asphalt of this type is, e.g., Trinidad-Epuré (Trinidad-refined) which has the following composition:

| | |
|---|---|
| Soluble bitumen | 53 to 55 weight % |
| Mineral portion | 36 to 37 weight % |
| Residual constituents | 9 to 10 weight % |

(compare Handbuch für Strassenwesen Planung-Bau-Verkehr-Betrieb 1979, Otto Elsner Verlagsgesellschaft, Darmstadt).

Trinidad-Epuré as well as the other known natural asphalts have the disadvantage that in spite of the very high filler content they are solid and must be melted before use.

SUMMARY OF THE INVENTION

According to the invention there is prepared a powder (or pulverulent) bitumen concentrate containing 10 to 85 weight %, preferably 40 to 80 weight %, of synthetic silica.

As synthetic silicas there can be used precipitated silica as well as pyrogenically produced silica.

The precipitated silica can have a BET-surface area of 120 to 500 m$^2$/g. In a given case it can be ground by a steam jet, spray dried or spray dried and ground.

The pyrogenically produced silica can have a BET-surface area of 100 to 400 m$^2$/g.

The bitumen concentrate of the invention can be produced by simply mixing the liquid bitumen with the synthetic silica or spraying the liquid bitumen on the synthetic silica.

The bitumen concentrate of the invention has the advantage that in spite of the high proportion of bitumen it is powdery, temperature stable and flowable.

Furthermore according to another aspect of the invention, the use of the powdery bitumen concentrate in asphalt mixture for building roads, results in a surprisingly high stiffening effect.

The powdery bitumen concentrate of the invention is described in more detail in the following examples.

The process can comprise, consist essentially of or consist of the steps set forth with the stated materials.

Unless otherwise indicated all parts and percentages are by weight.

DETAILED DESCRIPTION OF THE INVENTION

For the production of powdery bitumen concentrate there was carried out the following operation:

1. Heat the particular silica and the bitumen to 140° C. in the drying oven. 2. There is present in the mixing vessel the weighed out amount of silica. Add the bitumen in portions with stirring (by hand or with a wing stirrer according to the amount), powerful subsequent mixing until visible homogenization. 3. Bringing out the still hot composition into a sheet, spreading until cooling to room temperature. 4. The cold, friable to granulate type composition is disintegrated and ground in the Braun mixer. 5. The powder is placed on a 0.75 mm sieve, sieved, homogenized in the glass container in a Turbula mixer.

The bulk density of the powders in each case was determined (g/cm$^3$). In order to find an indication of the storage stability there were carried out pressure testings over 36 hours in pressure cylinders (diameter 49 mm, impressions 3.2 kp=1.7 N/cm$^2$ and 11.2 kp=5.95 N/cm$^2$) at normal temperature. The recording was according to the school annotation system. The results are compiled in Table 1.

In order to check the temperature stability of the individual bitumen powders, in each case the samples were tempered at increasing temperature in the drying oven (increasing in each case around 10° C. to 20° C.). The results are compiled in Table 2.

TABLE 1

| Sample Designation | Bulk Density g/cm$^3$ | Pressure Testing 1.7 N/cm$^2$ | 5.95 N/cm$^2$ | Notes |
|---|---|---|---|---|
| 50% B 80 (bitumen) | | | | dry |
| 50% SIPERNAT 22 | 0.349 | 3 | 3–4 | powder |
| 60% B 80 (bitumen) | | | | dry |
| 40% SIPERNAT 22 | 0.373 | 4 | 4–5 | powder |
| 66.7% B 80 (bitumen) | | | | dry |
| 33.3% SIPERNAT 22 | 0.437 | 4 | 5 | powder |
| 70% B 80 (bitumen) | | | | dry |
| 30% SIPERNAT 22 | 0.440 | 4 | 5 | powder |
| 80% B 80 (bitumen) | | | | dry |
| 20% SIPERMAN 22 | 0.459 | 5 | 6 | powder |
| 60% B 80 (bitumen) | | | | dry |
| 40% FK 320 | 0.450 | 4 | 5 | powder |
| 66.7% B 80 (bitumen) | | | | dry |
| 33.3% FK 320 DS | 0.578 | 5 | 6 | powder |

The determination of the bulk density was according to DIN 53 194.

Evaluation Table for Pressure Testing

3=satisfactory—loosely shaped, with slight finger pressure substantially powdery disintegration 4=adequate—loosely adhered together, still most finely disintegrated with finger pressure 5=imperfect—semisolidly adhered together, no longer most finely disintegrated with finger pressure 6=insufficient—solidly adhered together.

A detailed description of this procedure for evaluation is found in Seifen-Öle-Fette-Wachse 8900 Augsburg, Year 94/1968, Part 12, pages 849–858.

A special printing of this literature appears as No. 31 in the series of pigment publications of the firm Degussa.

TABLE 2

| Sample Designation | Start | 1 hour 80° C. | 1 hour 90° C. | 1 hour 100° C. | 14 hours 120° C. | 1 hour 140° C. | 1 hour 160° C. | 1 hour 1880° C. |
|---|---|---|---|---|---|---|---|---|
| 50% B 80 | gray-brown | gray-brown | gray-brown | gray-brown | light beige | light beige | light beige | light brown |
| 50% SIPERNAT 22 | loose | loose | loose | loose | loose | loose | loose | loose |
| 60% B 80 | gray | gray | gray | gray | beige | beige | medium brown | brown |
| 40% SIPERNAT 22 | loose | loose | loose | loose | loose | loose | loose | loose |
| 66.7% B 80 | gray | gray | light brown | medium brown | dark brown | dark brown | dark brown | black |
| 33.3% SIPERNAT 22 | loose | loose | loose | loose | loose | lightly adhered together | adhered together | adhered together |
| 70% B 80 | gray | gray | light brown | medium brown | dark brown | dark brown | dark brown | black |
| 30% SIPERNAT 22 | loose | loose | loose | loose | loose | lightly adhered together | adhered together | adhered |
| 80% B 80 | gray | brown | dark brown | dark brown | black | black | black | black |
| 20% SIPERNAT 22 | loose | loose | lightly adhered together | adhered together | adhered together | adhered together | adhered together | adhered together |
| 60% B 80 | gray | gray | light brown | brown | light brown | brown | brown | dark brown |
| 40% FK 320 | loose | loose | loose | loose | lightly adhered together | lightly adhered together | adhered together | adhered together |
| 66.7% B 80 | gray-brown | gray-brown | medium brown | brown | brown | dark brown | dark brown | black |
| 33.3% FK 320 DS | loose | loose | loose | loose | lightly adhered together | adhered together | adhered together | adhered together |

The silica FK 320 used is a precipitated silica with the following physical chemical properties:

| | |
|---|---|
| Apperance | loose, white powder |
| X-ray structure | amorphous |
| Surface area | 170 m²/g (according to BET) |
| Average size of the primary particles | 18 nanometer |
| Specific gravity | 2.05 g/ml |
| Degree of purity | $SiO_2^{(6)}$ 98% |
| | $Na_2O^{(6)}$ 1% |
| | $Al_2O_3^{(6)}$ 0.2% |
| | $SO_3^{(6)}$ 0.8 |
| Loss on drying[1] | 6% |
| Loss on ignition[2][3] | 5% |
| pH[4] | 6.3% |
| Solubility | practically insoluble in water |
| Characteristics | precipitated silica |
| Tamped density[5] | 200 g/l |
| Sieve residue according to Mocker (DIN 53 580) | 0.2% |

[1]DIN 53 198, Method A
[2]Based on the material dried for 2 hours at 105° C. DIN 55 921
[3]DIN 52 911
[4]DIN 53 200
[5]DIN 53 194
[6]Based on the material ignited for 2 hours at 1000° C.

A silica 320 DS is a precipitated and steam jet ground silica having the following physical chemical properties:

| | |
|---|---|
| Appearance | loose, white powder |
| X-ray structure | amorphous |
| Surface area | 170 m²/g (according to BET) |
| Average size of the primary particles | 18 nanometer |
| Specific gravity | 2.05 g/ml |
| Degree of purity | $SiO_2^{(6)}$ 98% |
| | $Na_2O^{(6)}$ 1% |
| | $Al_2O_3^{(6)}$ 0.2% |
| | $SO_2^{(6)}$ 0.8 |
| Loss on drying[1] | 6% |
| Loss on ignition[2][3] | 5% |
| pH[4] | 6.3% |
| Solubility | practically insoluble in water |
| Characteristics | precipitated silica having a high fineness of grinding |
| Tamped density[5] | 70 g/l |
| Sieve residue according to Mocker (DIN 53 580) | 0% |

[1]DIN 53 198, Method A
[2]Based on the material dried for 2 hours at 105° C.
[3]DIN 52 911
[4]DIN 53 200
[5]DIN 53 194
[6]Based on the material calcined at 1000° C. for 2 hours The silica Sipernat 22 is a precipitated and spray dried silica having the following physical-chemical properties:

| | | |
|---|---|---|
| Surface area according to BET | m²/g | 190 |
| Average size of the primary particles | nanometer | 18 |
| Average size of the secondary particles | micrometer | 80 |
| Tamped density (DIN 53 194) | g/l | 220 |
| Loss on drying (DIN 55 921) (2 hours at 105° C.) | % | 6 |
| Loss on ignition[1] (DIN 55 921) (2 hours at 1000° C.) | % | 5 |
| pH (DIN 53 200) | | 6.3 |
| $SiO_2$ (DIN 55 921) | % | 98 |
| $Al_2O_3$ | % | 0.2 |
| $Fe_2O_3$ | % | 0.03 |
| $Na_2O$ | % | 1 |
| $So_3$ | % | 0.8 |
| Sieve residue according to Mocker (DIN 53 580) | % | 0.5 |
| Oil number (according to DIN 53 199) | g/100 g | |

[1]Based on the material dried for 2 hours at 105° C.
[2]In water: acetone or methanol 1:1
[3]Based on the material ignited for 2 hours at 1000° C.
[4]Contains about 2% chemically bound carbon

USE OF THE POWDERY BITUMEN CONCENTRATE IN ASPHALT

In connection therewith there are concerned the following materials and combinations of materials:
Sipernat 22
B 80 to Sipernat 22 (50/50), powder
Natural asphalt-Trinidad Epuré, non-comminuted The additives were added in the laboratory to the mixtures of an asphalt concrete 0/11 mm suited for use in the classified road construction. In this connection in consideration of the amounts of crushed rock and binders contained in the additives the remaining composition of the mixtures are the same.

As binder for a comparison mixture and the mixture with additives road construction bitumen B 80 there is provided for a second comparison mixture road construction bitumen B 65.

The following tests were undertaken:
1. Production of specimens according to Marshall from the various asphalt mixtures.
2. Determination of space density, hollow space content, as well as stability and flow value according to Marshall on the specimens according to 1.
3. Carrying out creep tests on every three specimens produced according to 1.

Therewith for all mixtures there was reached the following particle size distribution of the mineral mixture:

| Sieve Passage: | | | | | | | |
| --- | --- | --- | --- | --- | --- | --- | --- |
| 0.09 | 0.25 | 0.71 | 2.0 | 5.0 | 8.0 | 11.2 | mm |
| 8.6 | 15.0 | 25.0 | 40.0 | 67.0 | 84.0 | 100.0 | weight % |

The binder content of all mixtures was 5.9 weight %.
Table 3 gives a summary of the composition of the mixtures.

Mixing Process and Specimen Production

Asphalt mixtures were mixed in batches of 6,300 grams or 4,000 grams in the laboratory mixture while maintaining a homegeneous discharge.

The powdery additives were brought into the hot mixture according to the proportion of bitumen but *before* the limestone powder.

The corresponding amount of Trinidad-Epuré was melted and added in advance to the bitumen portion.

No peculiarities were observed in the asphalt mixtures. In all cases there resulted a homogeneously encased, normal appearing mixed goods.

There were produced from each mixture variant 5+3=8 specimens according to Marshall.

TABLE 3

| Mixture | Type of Additive | Additive Amount (parts by weight) | Type (original) | Binder From additive (parts by weight) | Original (parts by weight) | Total (parts by weight %) |
| --- | --- | --- | --- | --- | --- | --- |
| 1 | — | — | B 65 | — | 6.27 | 5.9 |
| 2 | — | — | B 80 | — | 6.27 | 5.9 |
| 3 | SIPERNAT 22 | 0.5 | B 80 | — | 6.27 | 5.9 |
| 8 | TRINIDAD-EPURÉ | 2.0 | B 80 | 1.1 | 5.17 | 5.9 |
| 9 | SIPERNAT with B 80 (Powder 50/50) | 2.0 | B 80 | 1.0 | 5.27 | 5.9 |

| Mixture | From Additive (parts by weight) | From Granulation (parts by weight) | Mineral Limestone (parts by weight) | True Filler (parts by weight) | Sand (parts by weight) | Chips (parts by weight) |
| --- | --- | --- | --- | --- | --- | --- |
| 1 | — | 100 | 6.0 | 2.6 | 31.4 | 60 |
| 2 | — | 100 | 6.0 | 2.6 | 31.4 | 60 |
| 3 | 0.5 | 99.5 | 5.5 | 2.6 | 31.4 | 60 |
| 8 | 0.9 | 99.1 | 5.1 | 2.6 | 31.4 | 60 |
| 9 | 1.0 | 99.0 | 5.0 | 2.6 | 31.4 | 60 |

INVESTIGATIONS AND INVESTIGATION RESULTS

Composition and Production of the Specimens

There were used for the mineral mixture for the production of an asphaltic concrete 0/11 mm according to TV bit 3/72 full of chips of basalt rich chips, basalt rich broken sand, a natural sand and a commercial limestone powder. The mineral materials with the exception of the limestone powder were sieved in particle classes and the mineral mixtures again combined according to a provided recipe.

Portion above 2.0 mm: basalt rich chips 2/5, 5/8 and 8/11
Sand 0.09/2.0 mm: basalt rich broken sand and natural sand (in the ratio 3:1)
Filler 0/0.09 mm: limestone powder, basalt true filler +additive Of the eight specimens three were used for determination of stability and flow value, and three for the creep test.

Space density and hollow space content were ascertained on all specimens.

The results are collected in Table 4.

There were carried out at 3 specimens of each mixture creep tests with static load. Thereby the bases of the specimens were evened up through a compensating layer.

In the test there was applied to the specimen at a testing temperature of 40° C. a uniform surface load.

The uniaxial compressive strength was 0.1 MN/m². The formation of the uniaxial strength state was promoted by arrangement of a sliding layer. The resulting compressions $\Sigma = \Delta h/h \times 1,000$ in $^{o}/_{oo}$ were plotted in the double logarithmic scale, so that the function of the tensions could be recognized from the time after 1 to 5 hours of an asymptotic end value.

From the transition t→∞ there can be derived a final tension and a strain modulus $S_{mix}$ as material index of the logarithm.

The final tension and the strain modulus are compiled in Table 5.

TABLE 4

Test Results on Specimens According to Marshall

| Mixture | Space Density g/cm³ | Raw Density g/cm³ | Hollow Space Content In the Asphalt Vol. % | Hollow Space Content In the Mineral Framework Vol. % | Degree of Packing % | Stability kN | Flow Value mm |
|---|---|---|---|---|---|---|---|
| 1 | 2,569 | 2,635 | 2.50 | 17.3 | 85.5 | 7.6 | 6.0 |
| 2 | 2,570 | 2,635 | 2.47 | 17.3 | 85.7 | 6.9 | 5.3 |
| 3 | 2,561 | 2,635 | 2.81 | 17.6 | 84.0 | 7.5 | 5.9 |
| 8 | 2,561 | 2,635 | 2.81 | 17.6 | 84.0 | 7.0 | 6.0 |
| 9 | 2,556 | 2,635 | 3.00 | 17.7 | 83.1 | 7.7 | 5.9 |

TABLE 5

Results of Creep Tests

| Mixture | Final Tension ⁰/₀₀ | Strain Modulus $S_{mix}$ (N/mm²) t→∞ |
|---|---|---|
| 1 | 5.8 | 17.2 |
| 2 | 6.2 | 16.2 |
| 3 | 5.6 | 17.9 |
| 8 | 6.1 | 16.5 |
| 9 | 5.6 | 17.8 |

EVALUATION OF THE TEST RESULTS

Appearance Evaluation of the Asphalt Mixtures

The mixtures with additives (3, 8, 9) do not differ in behavior and appearance with the mixes without additives (1, 2)

Peculiarities were not established compared to normally mixed goods.

Properties of Specimens

The specimens produced under the same compression conditions at 135° C. show differences in the space densities between the zero mixtures on the one hand and the mixtures with additives on the other. Therewith they give an indication of the relations in mixed goods structures.

In the laboratory tests the compression resistance of the mixed goods characterized by the hollow space proportion increased at 135° C. both with addition of SIPERNAT 22 and also Trinidad-Epuré, i.e., both additives cause stiffening.

The greatest effect was produced by the addition of Sipernat/bitumen powder (Mixture 9), in which case it should be observed that the Sipernat portion in the total mixture is once again increased compared to Mixture 3. An interesting comparison is offered by Mixture 9 and Mixture 8 (Trinidad-Epuré), since in both cases there are added mineral material/binder combinations with quantitatively about the same ratios. Based on the results it can be established that the stiffening produced by Trinidad-Epuré is exceeded by the synthetically produced products.

Creep Tests

Creep tests at 40° C. give information in regard to the resistance to deformation of the mixed goods. They refer in this connection to the ratios in service with elevated outside temperatures.

The results of the laboratory tests clearly show increases of the decisive strain modulus (Deformation Modulus) of the mixtures with SIPERNAT 22. (Mixtures 3 and 9) compared to the comparison mixture with B 80 (Mixture 2), with simultaneous reduction of the corresponding final tensions.

The results of the creep tests at 40° C. show that an equal increase of the resistance to deformation of the mixture with Trinidad-Epuré.

The entire disclosure of German priority application No. P 29 33 339.9-44 is hereby incorporated by reference.

As used in the claims the term road is intended to include streets, bike paths, sidewalks, and other surfaces for vehicle or pedestrian use.

What is claimed is:

1. A powdery bitumen concentrate having 40 to 80% of synthetic silica wherein the synthetic silica is precipitated silica having a BET surface area of 120 to 500 m²/g or pyrogenically produced silica having a BET surface area of 100 to 400 m²/g.

2. A powdery bitumen concentrate according to claim 1 wherein the synthetic silica has an average primary particle size of about 18 nanometers.

3. A powdery bitumen concentrate according to claim 1 containing 40 to 50% of synthetic silica.

4. A powdery bitumen concentrate according to claim 1 wherein the synthetic silica is precipitated silica having a BET surface area of 120 to 500 m²/g.

5. A powdery bitumen concentrate according to claim 1 wherein the synthetic silica is pyrogenically produced silica having a BET surface area of 100 to 400 m²/g.

6. An asphalt composition suitable for constructing a street comprising the bitumen concentrate of claim 1 and asphalt.

7. An asphalt composition suitable for constructing a street comprising the bitumen concentrate of claim 4 and asphalt.

8. An asphalt composition suitable for constructing a street comprising the bitumen concentrate of claim 5 and asphalt.

9. In a bitumen concentrate and asphalt containing road the improvement comprising having present as the bitumen concentrate the bitumen-silica composition of claim 1.

10. In a bitumen concentrate and asphalt containing road the improvement comprising having present as the bitumen concentrate the bitumen-silica composition of claim 4.

11. In a bitumen concentrate and asphalt containing road the improvement comprising having present as the bitumen concentrate the bitumen-silica composition of claim 5.

* * * * *